(12) United States Patent
Ichimiya et al.

(10) Patent No.: US 12,179,353 B2
(45) Date of Patent: Dec. 31, 2024

(54) ROBOT AND ADJUSTING METHOD

(71) Applicant: SEIKO EPSON CORPORATION, Tokyo (JP)

(72) Inventors: Yuta Ichimiya, Matsumoto (JP); Hidenori Hama, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/965,848

(22) Filed: Oct. 14, 2022

(65) Prior Publication Data

US 2023/0118334 A1 Apr. 20, 2023

(30) Foreign Application Priority Data

Oct. 15, 2021 (JP) .................. 2021-169854

(51) Int. Cl.
*B25J 9/10* (2006.01)
*B25J 9/00* (2006.01)
(Continued)

(52) U.S. Cl.
CPC ............. *B25J 9/104* (2013.01); *B25J 9/0009* (2013.01); *B25J 9/1045* (2013.01); *F16H 7/18* (2013.01); *B25J 9/042* (2013.01)

(58) Field of Classification Search
CPC .......... B25J 9/104; B25J 9/1045; B25J 9/042; F16H 7/18; F16H 2007/185; F16H 2007/0842; F16H 2007/0861
See application file for complete search history.

(56) References Cited

U.S. PATENT DOCUMENTS 4,610,645 A * 9/1986 Donn .................... F16H 7/1281
474/112
4,693,666 A * 9/1987 Garin ..................... B25J 9/1045
414/744.5
(Continued)

FOREIGN PATENT DOCUMENTS

CN 104964010 A * 10/2015
CN 108443438 A * 8/2018 ............... F16H 7/14
(Continued)

*Primary Examiner* — Bobby Rushing, Jr.
(74) *Attorney, Agent, or Firm* — Harness, Dickey & Pierce, P.L.C.

(57) ABSTRACT

A robot includes a power source and a power transmission mechanism configured to transmit an output of the power source. The power transmission mechanism includes a fixed member, a first pulley configured to rotate around a first axis with respect to the fixed member, a second pulley disposed to be separated from the first pulley and configured to rotate, with respect to the fixed member, around a second axis parallel to the first axis, a belt wound around the first pulley and the second pulley and configured to transmit the rotation of one of the first pulley and the second pulley to another, a restricting member including a restricting section disposed to be opposed to the belt with a gap in a portion where the first pulley and the belt mesh with each other, and a screw having a center axis along the first axis and configured to fix the restricting member to the fixed member. The restricting member rotates around the center axis to thereby change a separation distance between the restricting section and the belt in a plan view from a direction extending along the first axis.

11 Claims, 11 Drawing Sheets

(51) Int. Cl.
*F16H 7/18* (2006.01)
*B25J 9/04* (2006.01)

(56) References Cited

U.S. PATENT DOCUMENTS

| | | | | |
|---|---|---|---|---|
| 4,728,252 A * | 3/1988 | Lada | ......................... | B25J 9/042 |
| | | | | 414/744.5 |
| 5,271,292 A * | 12/1993 | Sawada | ..................... | B25J 9/044 |
| | | | | 474/69 |
| 6,849,011 B2 * | 2/2005 | Calfa | ..................... | F16H 7/1281 |
| | | | | 474/135 |
| 7,081,059 B2 * | 7/2006 | Iwamoto | ................... | G01B 7/02 |
| | | | | 137/554 |
| 7,771,302 B2 * | 8/2010 | Pendergrass | .......... | F16H 7/1281 |
| | | | | 474/109 |
| 2017/0174254 A1 * | 6/2017 | Tomikawa | ............... | B62D 3/08 |

FOREIGN PATENT DOCUMENTS

| | | | | |
|---|---|---|---|---|
| DE | 102016202792 A1 * | 8/2017 | ............ | B25J 13/088 |
| EP | 0321935 A1 * | 6/1989 | | |
| JP | S62-090903 U | 6/1987 | | |
| JP | H02-066356 A | 3/1990 | | |
| JP | H08-121559 A | 5/1996 | | |
| JP | H09-032897 A | 2/1997 | | |
| JP | 3008174 B2 * | 2/2000 | | |
| JP | 2007-285836 A | 11/2007 | | |
| KR | 102118474 B1 * | 6/2020 | | |

\* cited by examiner

ROBOT AND ADJUSTING METHOD

The present application is based on, and claims priority from JP Application Serial Number 2021-169854, filed Oct. 15, 2021, the disclosure of which is hereby incorporated by reference herein in its entirety.

BACKGROUND

1. Technical Field

The present disclosure relates to a robot and an adjusting method.

2. Related Art

For example, JP-A-09-032897 (Patent Literature 1) describes a structure in which, in order to restrict tooth jumping of a timing belt that meshes with a driven pulley, a restricting member is fixed to a separated position spaced a predetermined interval apart from the timing belt.

However, when Patent Literature 1 is applied to a robot, since a fixed position of the restricting member is determined in Patent Literature 1, it is difficult to adjust an interval between the restricting member and the timing belt to a proper interval and it is difficult to improve a driving characteristic of the robot. If the interval is too narrow, the restricting member and the timing belt come into contact and the timing belt wears and decreases in service life. Conversely, if the interval is too wide, the tooth jumping of the timing belt cannot be restricted.

SUMMARY

A robot according to an aspect of the present disclosure includes: a power source; and a power transmission mechanism configured to transmit an output of the power source. The power transmission mechanism includes: a fixed member; a first pulley configured to rotate around a first axis with respect to the fixed member; a second pulley disposed to be separated from the first pulley and configured to rotate, with respect to the fixed member, around a second axis parallel to the first axis; a belt wound around the first pulley and the second pulley and configured to transmit the rotation of one of the first pulley and the second pulley to another; a restricting member including a restricting section disposed to be opposed to the belt with a gap in a portion where the first pulley and the belt mesh with each other; and a screw having a center axis along the first axis and configured to fix the restricting member to the fixed member. The restricting member rotates around the center axis to thereby change a separation distance between the restricting section and the belt in a plan view from a direction extending along the first axis.

An adjusting method according to an aspect of the present disclosure is an adjusting method for adjusting a separation distance between a restricting section and a belt in a power transmission mechanism including: a fixed member; a first pulley configured to rotate around a first axis with respect to the fixed member; a second pulley disposed to be separated from the first pulley and configured to rotate, with respect to the fixed member, around a second axis parallel to the first axis; the belt wound around the first pulley and the second pulley and configured to transmit the rotation of one of the first pulley and the second pulley to another; a restricting member including the restricting section disposed to be opposed to the belt with a gap in a portion where the first pulley and the belt mesh with each other; and a screw having a center axis along the first axis and configured to fix the restricting member to the fixed member, the restricting member rotating around the center axis to thereby change the separation distance between the restricting section and the belt in a plan view from a direction extending along the first axis, the adjusting method including: rotating the restricting member around the center axis to adjust the separation distance in a state in which the screw is loosened; and tightening the screw to fix the restricting member to the fixed member.

DESCRIPTION OF EXEMPLARY EMBODIMENTS

A robot and an adjusting method of the present disclosure are explained in detail below based on embodiments shown in the accompanying drawings. "Parallel" in this specification has a meaning including, besides parallelism, a state slightly deviating from the parallelism. That is, "parallel" has a meaning including a state that can be regarded the same as the parallelism in common general knowledge.

First Embodiment

Figure 1:
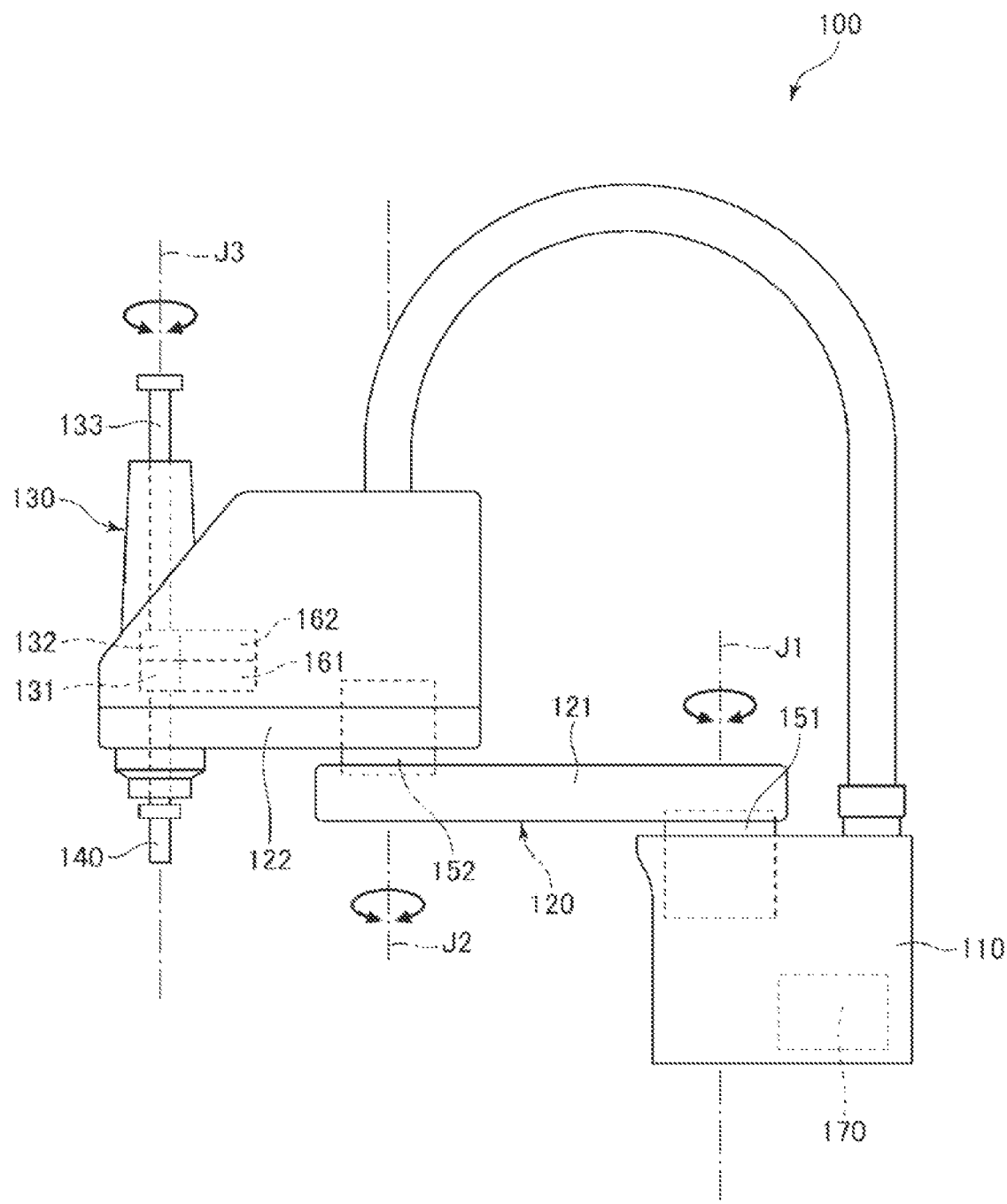
FIG. 1 is a side view showing an overall configuration of a robot according to a first embodiment.
Figure 2:
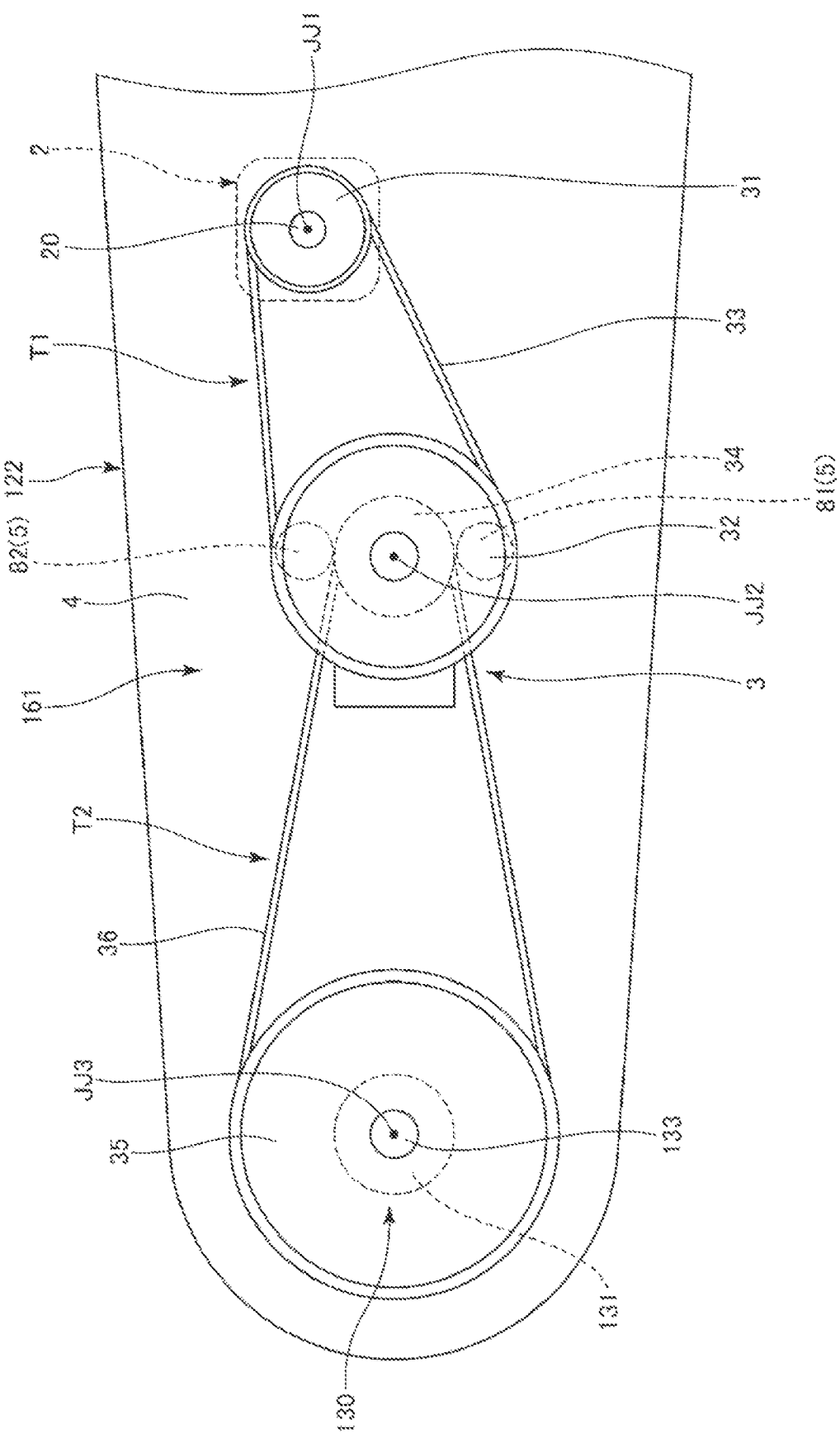
FIG. 2 is a top view showing a power transmission mechanism included in the robot shown in FIG. 1.
Figure 3:
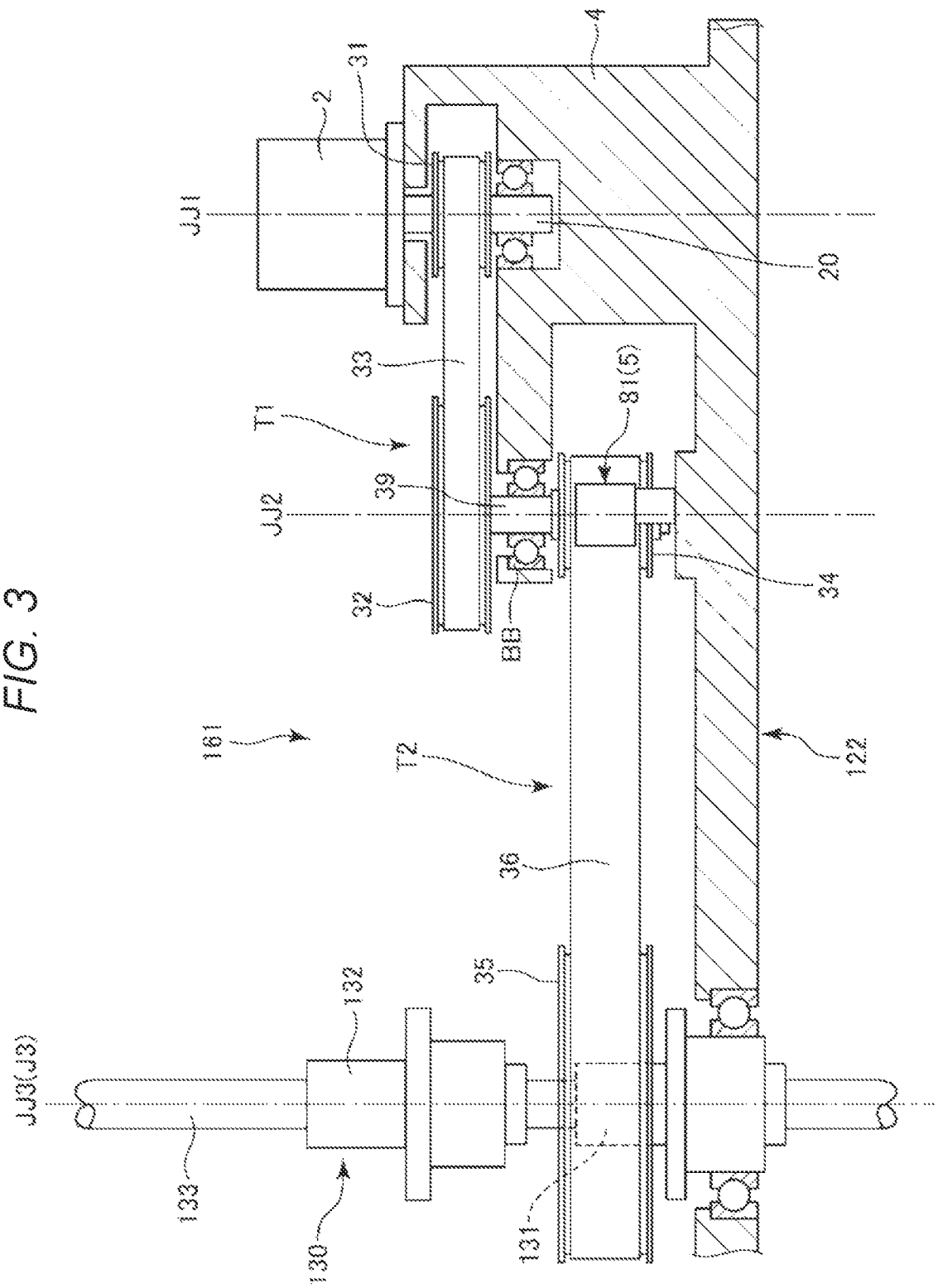
FIG. 3 is a sectional view showing the power transmission mechanism shown in FIG. 2.
Figure 4:
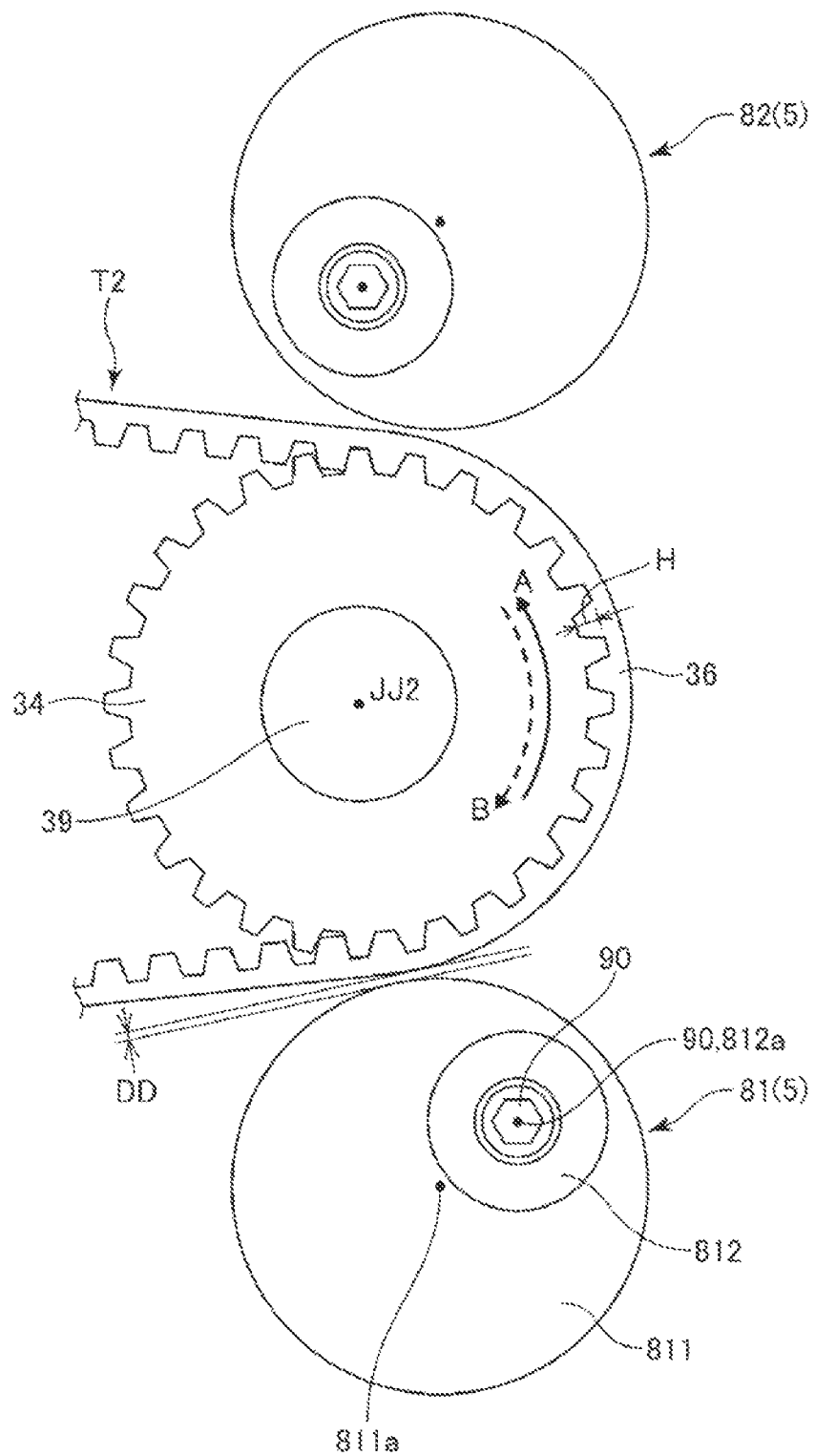
FIG. 4 is a bottom view showing a tooth jumping suppression mechanism included in a driving mechanism shown in FIG. 2.
Figure 5:
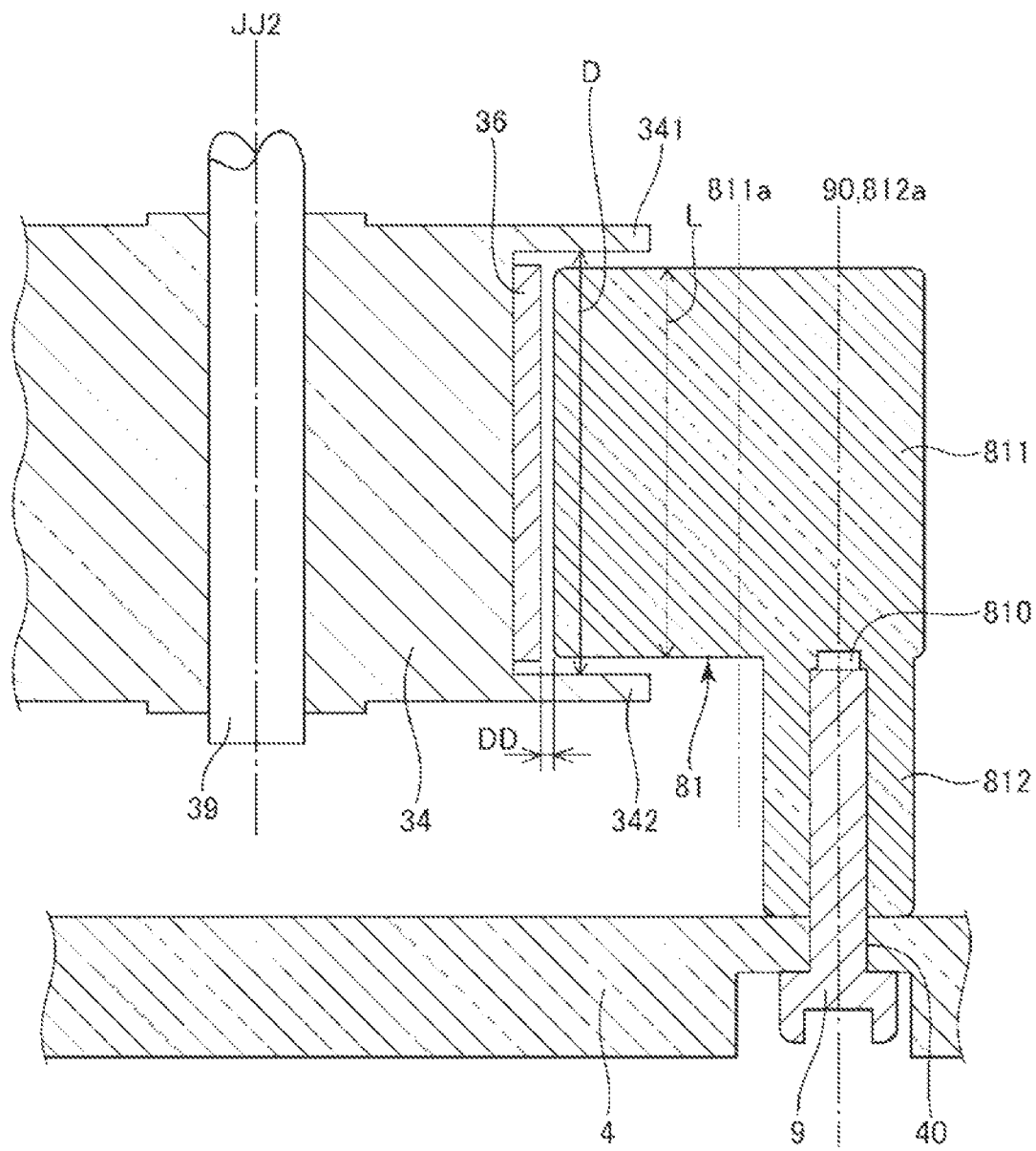
FIG. 5 is a sectional view showing a restricting member included in the tooth jumping suppression mechanism shown in FIG. 4.
Figure 6:
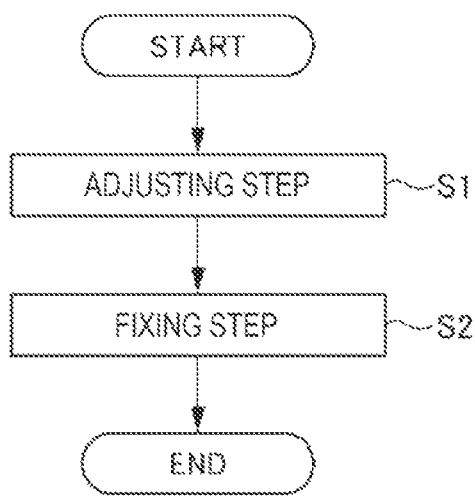
FIG. 6 is a flowchart showing a process for adjusting a separation distance between a belt and the restricting member.
Figure 7:
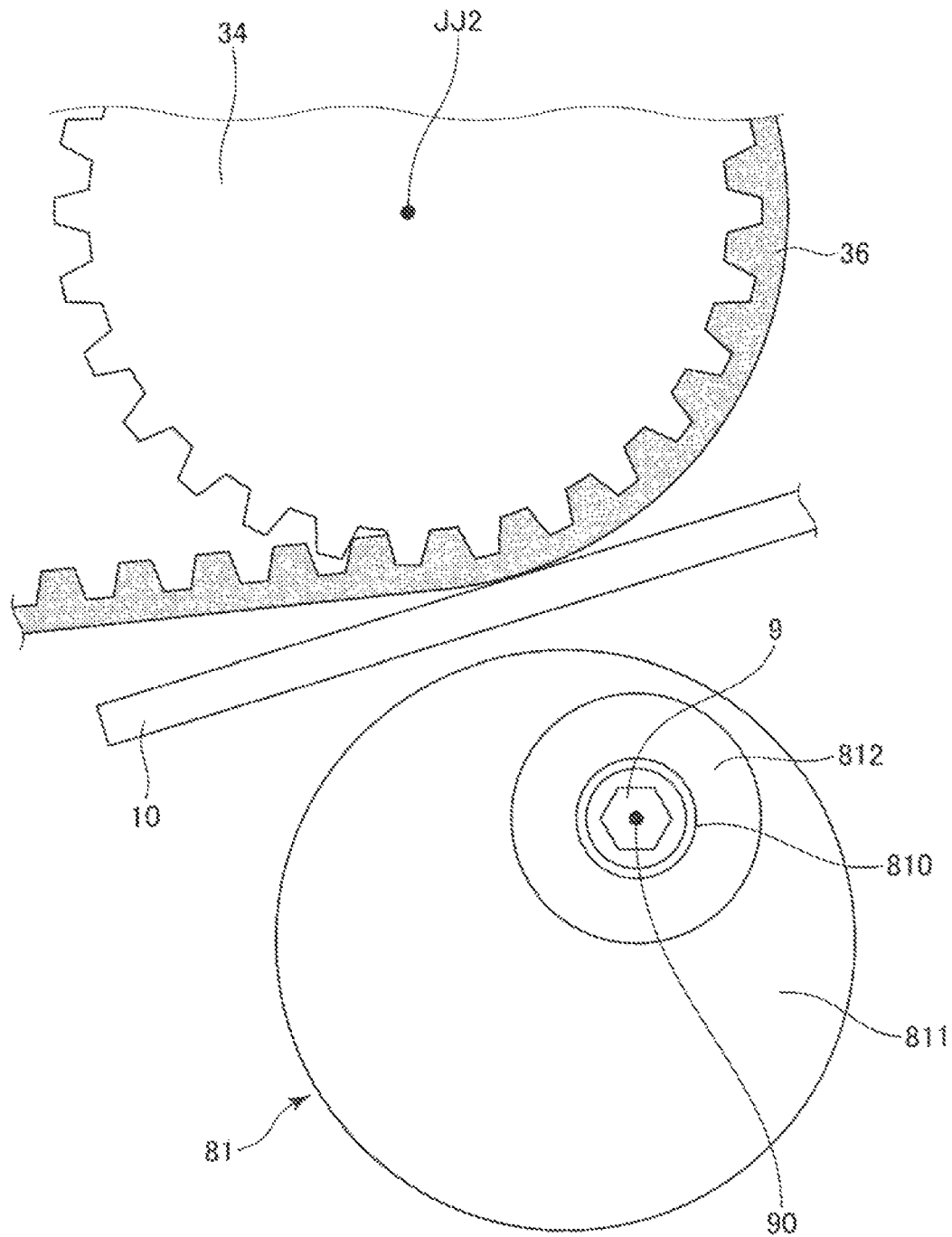
FIG. 7 is a bottom view for explaining the process shown in FIG. 6.
Figure 8:
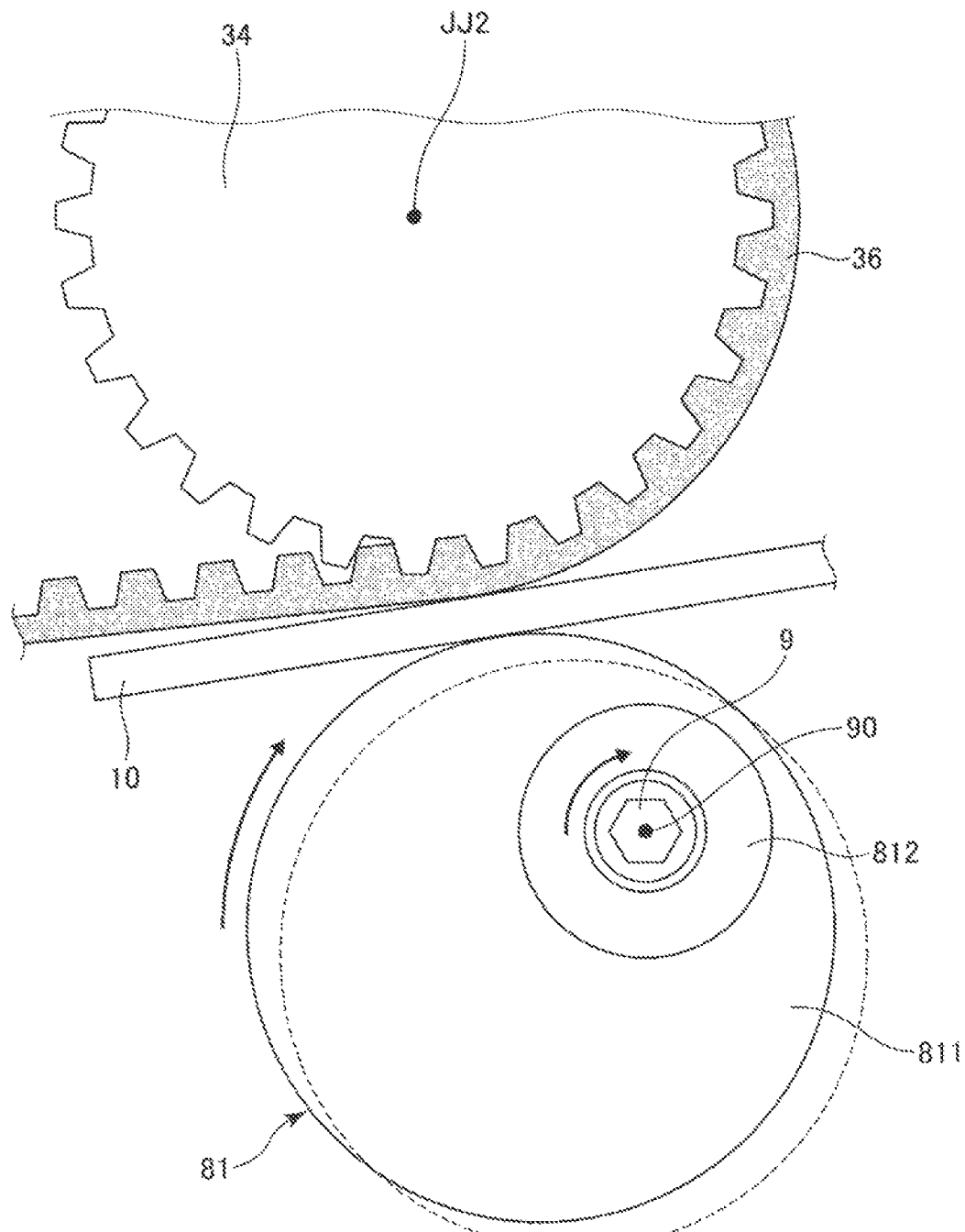
FIG. 8 is a bottom view for explaining the process shown in FIG. 6.
Figure 9:
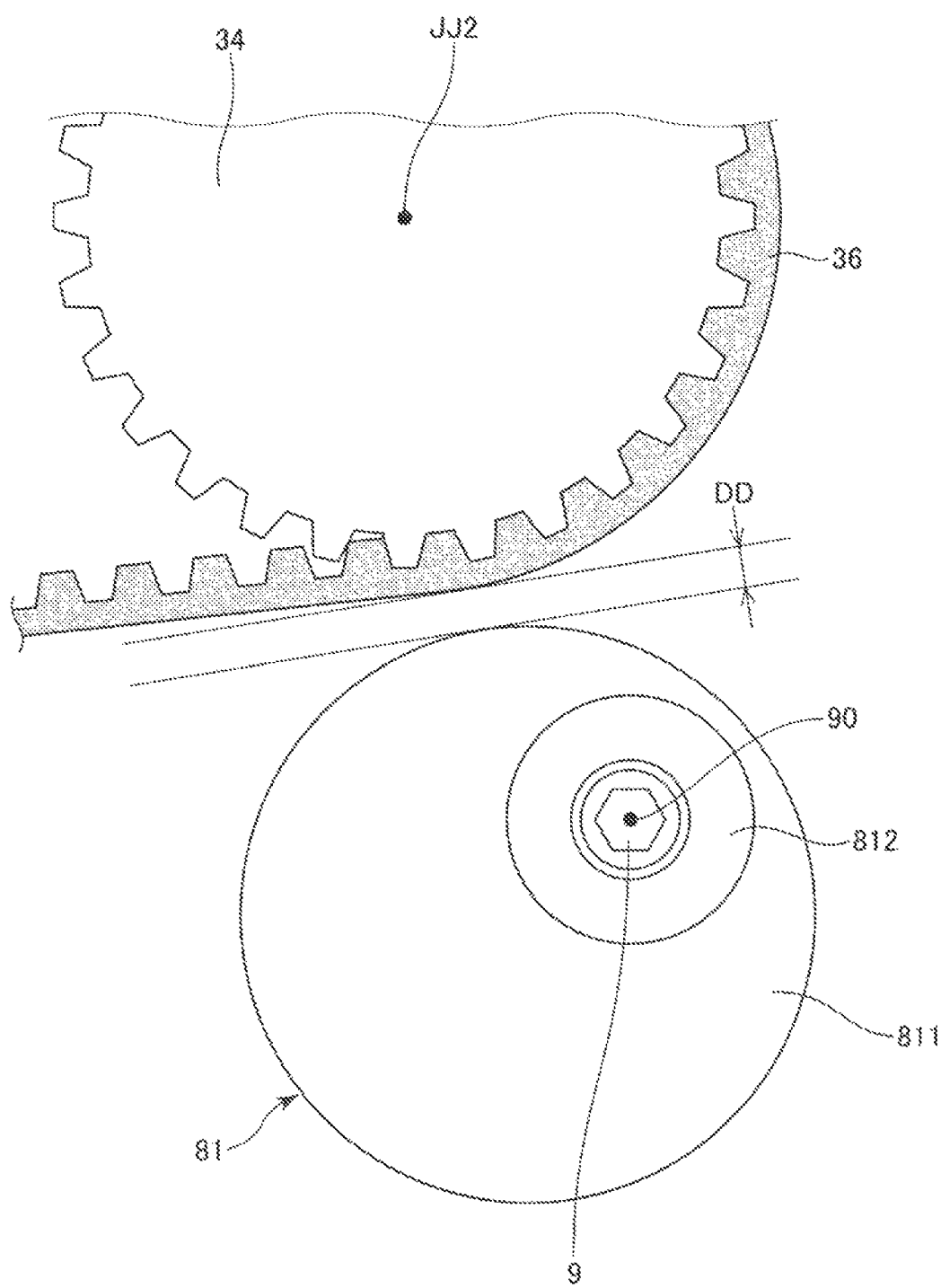
FIG. 9 is a bottom view for explaining the process shown in FIG. 6.

FIG. 1 is a side view showing an overall configuration of a robot according to a first embodiment. FIG. 2 is a top view showing a power transmission mechanism included in the robot shown in FIG. 1. FIG. 3 is a sectional view showing the power transmission mechanism shown in FIG. 2. FIG. 4 is a bottom view showing a tooth jumping suppression mechanism included in a driving mechanism shown in FIG. 2. FIG. 5 is a sectional view showing a restricting member included in the tooth jumping suppression mechanism shown in FIG. 4. FIG. 6 is a flowchart showing a process for adjusting a separation distance between a belt and the restricting member. FIGS. 7 to 9 are bottom views for explaining the process shown in FIG. 6.

A robot 100 shown in FIG. 1 is a SCARA robot and is used in kinds of work such as holding, conveyance, assembly, and inspection of workpieces such as electronic components. However, uses of the robot 100 are not particularly limited.

The robot 100 includes a base 110 fixed to a floor surface and a robot arm 120 coupled to the base 110. The robot arm 120 includes a first arm 121 that is coupled to the base 110 at the proximal end portion thereof and turns, with respect to the base 110, around a first turning axis J1 extending in the vertical direction and a second arm 122 that is coupled to the distal end portion of the first arm 121 at the proximal end portion thereof and turns, with respect to the first arm 121, around a second turning axis J2 extending in the vertical direction.

A work head 130 is provided at the distal end portion of the second arm 122. The work head 130 includes a spline nut 131 and a ball screw nut 132 coaxially disposed at the distal end portion of the second arm 122 and a spline shaft 133 inserted through the spline nut 131 and the ball screw nut 132. The spline shaft 133 is capable of rotating, with respect to the second arm 122, around a third turning axis J3, which is the center axis of the spline shaft 133, extending in the vertical direction and is capable of rising and falling along the third turning axis J3.

An end effector 140 is attached to the lower end portion of the spline shaft 133. The end effector 140 is detachably attachable. An end effector suitable for target work is selected as appropriate as the end effector 140. Examples of the end effector 140 include a hand that holds a workpiece with clamping or attraction and a work tool for performing predetermining machining on the workpiece.

The robot 100 includes a joint actuator 151 that couples the base 110 and the first arm 121 and turns the first arm 121 around the first turning axis J1 with respect to the base 110 and a joint actuator 152 that couples the first arm 121 and the second arm 122 and turns the second arm 122 around the second turning axis J2 with respect to the first arm 121. The robot 100 includes a driving mechanism 161 that rotates the spline nut 131 and rotates the spline shaft 133 around the third turning axis J3 and a driving mechanism 162 that rotates the ball screw nut 132 and lifts and lowers the spline shaft 133 in a direction extending along the third turning axis J3.

The robot 100 includes a robot control device 170 that is disposed in the base 110 and controls driving of the joint actuators 151 and 152 and the driving mechanisms 161 and 162 based on instructions from a not-shown host computer. The robot control device 170 can cause the robot 100 to perform desired work by controlling the joint actuators 151 and 152 and the driving mechanisms 161 and 162 independently from each other.

The robot control device 170 is configured from, for example, a computer and includes a processor that processes information, a memory communicably connected to the processor, and an external interface. Various programs executable by the processor are stored in the memory. The processor can read and execute the various programs and the like stored in the memory.

The overall configuration of the robot 100 is briefly explained above. Subsequently, the driving mechanism 161 that rotates the spline nut 131 and rotates the spline shaft 133 around the third turning axis J3 is explained in detail with reference to FIGS. 2 and 3.

As shown in FIGS. 2 and 3, the driving mechanism 161 includes a motor 2 functioning as a driving source and a power transmission mechanism 3 that transmits an output of the motor 2 to the spline nut 131. The motor 2 is fixed to a fixed member 4 configuring a frame of the second arm 122. An output shaft 20 of the motor 2 rotates around a first rotation axis JJ1 extending in the vertical direction. The motor 2 is, for example, an AC servomotor. However, the motor 2 is not particularly limited. For example, a DC servomotor or a stepping motor may be used as the motor 2.

The power transmission mechanism 3 includes a pulley 31 that is coupled to the output shaft 20 of the motor 2 and rotates around the first rotation axis JJ1 integrally with the output shaft 20. The power transmission mechanism 3 includes a pulley 32 that is disposed to be separated from the pulley 31 and rotates around a second rotation axis JJ2 extending in the vertical direction. The pulley 32 is disposed on the distal end side of the second arm 122 with respect to the pulley 31 and is located between the spline shaft 133 and the pulley 31. The pulleys 31 and 32 are respectively toothed pulleys.

The power transmission mechanism 3 includes a belt 33 that is wound around and couples the pulleys 31 and 32. The belt 33 is a toothed belt that meshes with the pulleys 31 and 32. Accordingly, when the pulley 31 rotates together with the output shaft 20, the rotation is transmitted to the pulley 32 via the belt 33 and the pulley 32 rotates following the pulley 31. The outer diameter of the pulley 32 is larger than the outer diameter of the pulley 31. Accordingly, a first speed reducer T1 that reduces the rotating speed of the output shaft 20 is configured by the pulley 31, the belt 33, and the pulley 32.

The power transmission mechanism 3 includes a pulley 34 functioning as a first pulley that is disposed side by side with the pulley 32 in a direction extending along the second rotation axis JJ2 and rotates around the second rotation axis JJ2. The pulley 34 is coupled to the pulley 32 via a shaft 39 extending along the second rotation axis JJ2 and rotates integrally with the pulley 32. The outer diameter of the pulley 34 is smaller than the outer diameter of the pulley 32. The shaft 39 is born by the fixed member 4 via a bearing BB between the pulley 32 and the pulley 34.

The power transmission mechanism 3 includes a pulley 35 functioning as a second pulley that is disposed to be separated from the pulley 34 and rotates around a third rotation axis JJ3 extending in the vertical direction. The pulley 35 is disposed on the distal end side of the second arm 122 with respect to the pulley 34 and disposed coaxially with the spline shaft 133. That is, the third rotation axis JJ3 coincides with the third turning axis J3. The spline nut 131 is inserted through and fixed to the pulley 35. The pulley 35 and the spline nut 131 integrally rotate. The pulleys 34 and 35 are respectively toothed pulleys.

The power transmission mechanism 3 includes a belt 36 that is wound around and couples the pulleys 34 and 35. The belt 36 is a toothed belt that meshes with the pulleys 34 and 35. Accordingly, when the pulley 34 rotates, the rotation is transmitted to the pulley 35 via the belt 36 and the pulley 35 rotates following the pulley 34. The outer diameter of the pulley 35 is larger than the outer diameter of the pulley 34. Accordingly, a second speed reducer T2 that reduces the rotating speed of the output shaft 20 is configured by the pulley 34, the belt 36, and the pulley 35.

In such a power transmission mechanism 3, an output of the motor 2 is transmitted to the spline nut 131 via the first speed reducer T1 and the second speed reducer T2. By interposing the first and second speed reducers T1 and T2 between the motor 2 and the spline nut 131 in this way, the rotating speed of the motor 2 can be sufficiently reduced and the spline nut 131 can be rotated at desired rotating speed.

Disposition flexibility of the motor 2 is improved and the second arm 122 is easily designed. In particular, by disposing the two speed reducers T1 and T2 between the motor 2 and the spline nut 131, the outer diameter of the pulley 35 can be set smaller than when one speed reducer is disposed. Accordingly, it is possible to suppress an increase in size and an increase in weight of the distal end portion of the second arm 122. It is possible to realize the robot 100 having an excellent driving characteristic.

The output of the motor 2 has to be increased to increase the load capacity of the end effector 140. However, if the output of the motor 2 is increased, larger torque is applied to the belts 33 and 36. Since the rotating speed of the output shaft 20 is reduced by the first speed reducer T1, larger torque is applied to the belt 36 than the belt 33. The belt 36 is formed thicker than the belt 33 in order to withstand the larger torque. Therefore, the belt 36 is hard and has a large restoring force. Accordingly, tooth jumping more easily occurs in the belt 36 than the belt 33. Jumping more easily occurs on the side of the pulley 34 having a smaller diameter of the pulleys 34 and 35 that mesh with the belt 36. Therefore, the power transmission mechanism 3 includes a tooth jumping suppression mechanism 5 for suppressing tooth jumping of the belt 36 in the pulley 34 in which tooth jumping most easily occurs among the pulleys 31, 32, 34, and 35. Consequently, it is possible to improve a driving characteristic of the robot 100.

The tooth jumping suppression mechanism 5 is explained in detail below. As shown in FIG. 4, the tooth jumping suppression mechanism 5 includes a pair of restricting members 81 and 82 disposed to be opposed to the pulley 34. When the pulley 34 rotates in a solid line arrow A direction, the restricting member 81 is located near a position where meshing of the belt 36 and the pulley 34 is started and the restricting member 82 is located near a position where the meshing of the belt 36 and the pulley 34 ends. Conversely, when the pulley 34 rotates in a broken line arrow B direction, the restricting member 82 is located near the position where the meshing of the belt 36 and the pulley 34 is started and the restricting member 81 is located near the position where the meshing of the belt 36 and the pulley 34 ends. Since the position is a part where tooth jumping particularly easily occurs, by disposing the restricting members 81 and 82 in this way, it is possible to effectively suppress tooth jumping of the belt 36.

However, the disposition of the restricting members 81 and 82 is not particularly limited. For example, the restricting member 82 may be omitted and only one restricting member 81 may be disposed. In this case, according to a use of the robot 100, the restricting member 81 only has to be disposed in a part where tooth jumping easily occurs.

The structure of the restricting members 81 and 82 is explained in detail below. However, since the restricting members 81 and 82 have the same configuration, the restricting member 81 is representatively explained below. Explanation of the restricting member 82 is omitted.

As shown in FIG. 5, the restricting member 81 is screwed to the fixed member 4 by a screw 9 having a center axis 90 extending along the second rotation axis JJ2. Specifically, a through-hole 40 through which the screw 9 is inserted is formed in the fixed member 4. A screw hole 810 opened in the lower surface and screwing with the screw 9 is formed in the restricting member 81. The through-hole 40 overlaps the screw hole 810. The screw 9 is inserted through the through-hole 40 from the lower side and screwed and inserted into the screw hole 810. Consequently, the restricting member 81 is fixed to the fixed member 4. Therefore, the restricting member 81 is capable of rotating around the center axis 90 when the screw 9 is loosened. Conversely, when the screw 9 is tightened, the restricting member 81 is fixed to the fixed member 4 and is incapable of rotating around the center axis 90.

Such a restricting member 81 includes a restricting section 811 and a projecting section 812 disposed along the center axis 90. The restricting section 811 is disposed to be opposed to the belt 36 with a gap. When an abnormality occurs, the belt 36 comes into contact with the restricting section 811 to restrict tooth jumping of the belt 36. Since the gap is formed, the belt 36 does not come into contact with the restricting section 811 at a normal time. Therefore, wear of the belt 36 can be suppressed and the life of the belt 36 is extended. On the other hand, the projecting section 812 is formed to project to the lower side from the restricting section 811 and disposed to extend the restricting member 81 to the fixed member 4. That is, the projecting section 812 functions as a spacer that fills a space between the restricting section 811 and the fixed member 4. Consequently, the restricting member 81 is easily fixed to the fixed member 4.

Both of the restricting section 811 and the projecting section 812 have columnar shapes. The restricting section 811 is larger in diameter than the projecting section 812. Since the restricting section 811 and the projecting section 812 are formed in the columnar shapes in this way, the restricting section 811 and the projecting section 812 can be formed by cutting. Therefore, the restricting member 81 can be easily and inexpensively manufactured. However, the shapes of the restricting section 811 and the projecting section 812 are not particularly limited. The restricting section 811 only has to have a shape for enabling the restricting section 811 to rotate around the rotation axis 90 to change a separation distance DD from the belt 36 as descried below, such as a triangular prism shape or an elliptical cylinder shape.

Whereas a center axis 812a of the projecting section 812 coincides with the center axis 90, a center axis 811a of the restricting section 811 is separated from the center axis 90. That is, the restricting section 811 is eccentric with respect to the center axis 90. Accordingly, when the screw 9 is loosened and the restricting member 81 is rotated around the center axis 90 with respect to the fixed member 4, the restricting section 811 eccentrically rotates around the center axis 90, whereby the separation distance DD between the restricting section 811 and the belt 36 changes. It is possible to effectively restrict tooth jumping of the belt 36 by appropriately adjusting the separation distance DD. Since the restricting section 811 is configured to be capable of eccentrically rotating around the center axis 90 in this way, it is easy to adjust the separation distance DD. The separation distance DD is not particularly limited but is, for example, preferably shorter than a meshing depth H of the belt 36 and the pulley 34. That is, it is preferable that DD<H (see FIG. 4). Consequently, it is possible to more effectively restrict tooth jumping of the belt 36.

As shown in FIG. 5, the pulley 34 includes a pair of flanges 341 and 342 located on both the sides of the belt 36. Separation of the belt 36 is restricted by the pair of flanges 341 and 342. When a separation distance between the pair of flanges 341 and 342 is represented as D and length along a direction parallel to the center axis 90 of the restricting section 811 is represented as L, the separation distance D and the length L are in a relation of D>L. Further, the upper end of the restricting section 811 is located further on the lower side than the flange 341 on the upper side and the lower end of the restricting section 811 is located further on the upper side than the flange 342 on the lower side. Accordingly, the restricting section 811 is capable of entering between the flanges 341 and 342 and an adjustment width of the separation distance DD increases. However, not only this, but, for example, when the separation distance DD can be adjusted to an appropriate distance (for example, DD<H) even if the restricting section 811 is not caused to enter between the flanges 341 and 342, the separation distance D and the length L may be in a relation of D≤L.

The power transmission mechanism 3 is explained above. Subsequently, an adjusting method for the separation distance D in the power transmission mechanism 3 is explained. The adjusting method is explained representatively about the restricting member 81. Explanation is omitted about the restricting member 82. As shown in FIG. 6, the adjusting method for the separation distance DD includes an adjusting step S1 for, in a state in which the screw 9 is loosened, rotating the restricting member 81 around the center axis 90 and adjusting the separation distance DD to a predetermined distance and a fixing step S2 for tightening the screw 9 and fixing the restricting member 81 to the fixed member 4. With such an adjusting method, the separation distance DD can be easily adjusted. In particular, in this embodiment, the adjusting step S1 and the fixing step S2 are simultaneously performed in one step as explained below.

First, the screw 9 is loosened to enable the restricting member 81 to rotate around the center axis 90. Subsequently, as shown in FIG. 7, a plate-like jig 10 is disposed between the restricting section 811 and the belt 36. The thickness of the jig 10 is designed to be equal to a target value of the separation distance DD. The jig 10 is made of a sufficiently hard material such as metal. As explained below, the jig 10 is not substantially deformed even if the jig 10 is only sandwiched by the restricting section 811 and the belt 36.

Subsequently, as shown in FIG. 8, the screw 9 is tightened in order to fix the restricting member 81 to the fixed member 4. At this time, the restricting member 81 rotates together with the screw 9 with frictional resistance generated in a screwing portion of the screw 9 and the restricting member 81. The rotation of the restricting member 81 stops in a state in which the restricting section 811 comes into contact with the jig 10 and the jig 10 is sandwiched by the restricting section 811 and the belt 36. If the screw 9 is continuously tightened, the restricting member 81 is fixed to the fixed member 4 in that state, that is, the state in which the jig 10 is sandwiched by the restricting section 811 and the belt 36. As it is seen from this process, the restricting member 81 is disposed to reduce the separation distance DD according to rotation in a screw tightening direction.

Finally, as shown in FIG. 9, if the jig 10 is removed from between the restricting section 811 and the belt 36, the separation distance DD equivalent to the thickness of the jig 10 is formed. With the adjusting method explained above, it is enough to dispose the jig 10 and tighten the screw 9. Therefore, it is possible to easily and accurately adjust the separation distance DD. In particular, in this embodiment, the adjusting step S1 and the fixing step S2 are simultaneously performed in one step. Therefore, an adjusting process decreases and the adjustment is more easily performed.

The robot 100 is explained above. As explained above, such a robot 100 includes the motor 2 functioning as the power source and the power transmission mechanism 3 that transmits the output of the motor 2. The power transmission mechanism 3 includes the fixed member 4, the pulley 34 functioning as the first pulley that rotates around the second rotation axis JJ2, which is the first axis, with respect to the fixed member 4, the pulley 35 functioning as the second pulley that is disposed to be separated from the pulley 34 and rotates, with respect to the fixed member 4, around the third rotation axis JJ3, which is the second axis, parallel to the second rotation axis JJ2, the belt 36 that is wound around the pulley 34 and the pulley 35 and transmits the rotation of one of the pulley 34 and the pulley 35 to the other, the restricting member 81 including the restricting section 811 disposed to be opposed to the belt 36 with the gap in the portion where the pulley 34 and the belt 36 mesh with each other, and the screw 9 that has the center axis 90 extending along the second rotation axis JJ2 and fixes the restricting member 81 to the fixed member 4. The restricting member 81 rotates around the center axis 90 to thereby change the separation distance DD between the restricting section 811 and the belt 36 in the plan view from the direction extending along the second rotation axis JJ2. With such a configuration, the robot 100 easily adjusts the separation distance DD.

As explained above, the separation distance DD is shorter than the meshing depth of the pulley 34 and the belt 36. Consequently, it is possible to more surely restrict tooth jumping of the belt 36.

As explained above, the pulley 34 includes the pair of flanges 341 and 342 located on both the sides of the belt 36 in the direction extending along the second rotation axis JJ2. Consequently, it is possible to restrict the belt 36 from separating from the pulley 34.

As explained above, the length L along a direction parallel to the center axis 90 of the restricting section 811 is shorter than the separation distance D between the pair of flanges 341 and 342. The restricting section 811 enters between the pair of flanges 341 and 342 according to the rotation around the center axis 90. Consequently, it is possible to adjust the separation distance DD without being hindered by the flanges 341 and 342.

As explained above, the restricting section 811 is formed in the columnar shape disposed eccentrically with respect to the center axis 90. Consequently, the restricting section 811 can be formed by cutting. Therefore, the restricting member 81 is easily and inexpensively manufactured.

As explained above, the restricting member 81 includes the projecting section 812 that projects from the restricting section 811 and is located between the restricting section 811 and the fixed member 4. Such a projecting section 812 functions as the spacer between the restricting section 811 and the fixed member 4. Consequently, the restricting member 81 is easily fixed to the fixed member 4.

As explained above, the robot 100 includes the base 110, the first arm 121 that is coupled to the base 110 and turns around the first turning axis J1 with respect to the base 110, the second arm 122 that is coupled to the first arm 121 and turns around the second turning axis J2 with respect to the first arm 121, and the spline shaft 133 that is disposed in the second arm 122 and rotates around the third turning axis J3 with respect to the second arm 122. The power transmission mechanism 3 transmits the output of the motor 2 and rotates the spline shaft 133 around the third turning axis J3. In such a configuration, the output of the motor 2 has to be increased in order to increase the load capacity of the robot 100. However, if the output of the motor 2 is increased, tooth jumping more easily occurs. Accordingly, the effect of restricting tooth jumping by the restricting member 81 is more conspicuously exerted. The driving characteristic of the robot 100 can be improved.

As explained above, the power transmission mechanism 3 includes the fixed member 4, the pulley 34 functioning as the first pulley that rotates around the second rotation axis JJ2, which is the first axis, with respect to the fixed member 4, the pulley 35 functioning as the second pulley that is disposed to be separated from the pulley 34 and rotates, with respect to the fixed member 4, around the third rotation axis JJ3, which is the second axis, parallel to the second rotation axis JJ2, the belt 36 that is wound around the pulley 34 and the pulley 35 and transmits the rotation of one of the pulley 34 and the pulley 35 to the other, the restricting member 81 including the restricting section 811 disposed to be opposed to the belt 36 with the gap in the portion where the pulley 34 and the belt 36 mesh with each other, and the screw 9 that has the center axis 90 along the second rotation axis JJ2 and fixes the restricting member 81 to the fixed member 4. The restricting member 81 rotates around the center axis 90 to thereby change the separation distance DD between the restricting section 811 and the belt 36 in the plan view from the direction extending along the second rotation axis JJ2. With such a configuration, the power transmission mechanism 3 easily adjusts the separation distance DD.

As explained above, the adjusting method is the adjusting method for adjusting the separation distance DD between the restricting section 811 and the belt 36 in the power transmission mechanism 3 including the fixed member 4, the pulley 34 functioning as the first pulley that rotates around the second rotation axis JJ2, which is the first axis, with respect to the fixed member 4, the pulley 35 functioning as the second pulley that is disposed to be separated from the pulley 34 and rotates, with respect to the fixed member 4, around the third rotation axis JJ3, which is the second axis, parallel to the second rotation axis JJ2, the belt 36 that is wound around the pulley 34 and the pulley 35 and transmits the rotation of one of the pulley 34 and the pulley 35 to the other, the restricting member 81 including the restricting section 811 disposed to be opposed to the belt 36 with the gap in the portion where the pulley 34 and the belt 36 mesh with each other, and the screw 9 that has the center axis 90 along the second rotation axis JJ2 and fixes the restricting member 81 to the fixed member 4, the restricting member 81 rotating around the center axis 90 to thereby change the separation distance DD between the restricting section 811 and the belt 36 in the plan view from the direction extending along the second rotation axis JJ2. The adjusting method includes the adjusting step S1, which is a step of, in the state in which the screw 9 is loosened, rotating the restricting member 81 around the center axis 90 and adjusting the separation distance DD and the fixing step S2, which is a step of tightening the screw 9 and fixing the restricting member 81 to the fixed member 4. With such a method, the separation distance DD can be easily and accurately adjusted.

As explained above, in the adjusting step S1, the jig 10 is disposed between the restricting section 811 and the belt 36 and the jig 10 is sandwiched by the restricting section 811 and the belt 36 to adjust the separation distance DD. With such a method, by setting the thickness of the jig 10 to the target value of the separation distance DD, the separation distance DD can be easily adjusted to the target value. Accordingly, the separation distance DD can be easily and accurately adjusted.

As explained above, when the screw 9 is tightened to fix the restricting member 81 to the fixed member 4, the adjusting step S1 and the fixing step S2 are simultaneously performed by rotating the restricting member 81 around the center axis 90 together with the screw 9 with the friction between the screw 9 and the restricting member 81. Consequently, the adjusting process decreases and the adjustment is more easily performed.

Second Embodiment

Figure 10:
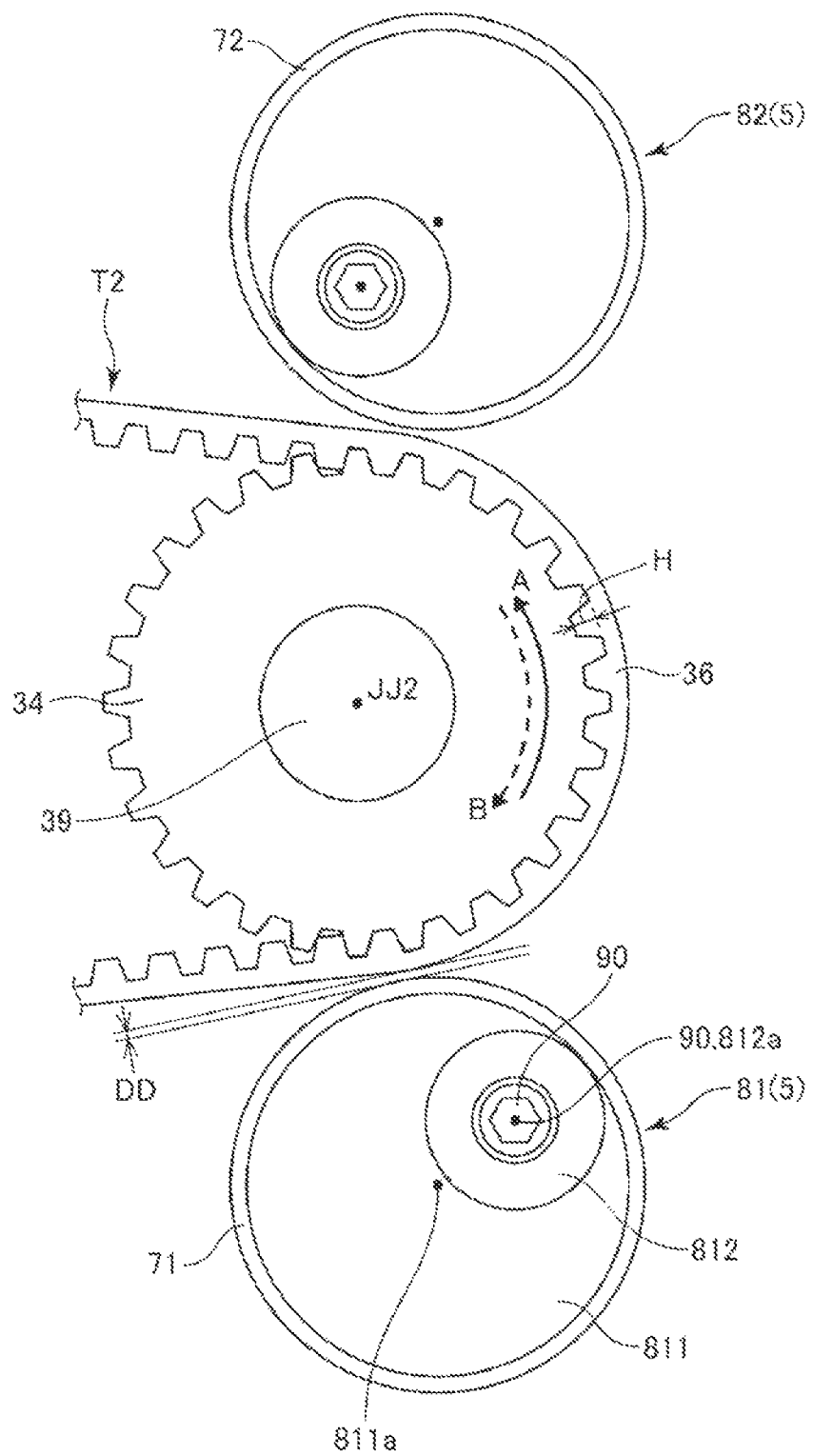
FIG. 10 is a bottom view showing a power transmission mechanism in a second embodiment.

FIG. 10 is a bottom view showing a power transmission mechanism in a second embodiment.

The robot 100 in this embodiment is the same as the robot 100 in the first embodiment except that the configuration of the power transmission mechanism 3 is different. Accordingly, in the following explanation, concerning this embodiment, differences from the first embodiment explained above are mainly explained. Explanation of similarities to the first embodiment is omitted. In the figures in this embodiment, the same components as the components in the first embodiment explained above are denoted by the same reference numerals and signs.

As shown in FIG. 10, the power transmission mechanism 3 in this embodiment includes a sensor 71 that is provided in the restricting member 81 and detects contact of the restricting section 811 and the belt 36. Consequently, an abnormality of the power transmission mechanism 3 can be detected and can be used as a material for determining, for example, necessity of maintenance. The sensor 71 is not particularly limited. For example, a force sensor, a strain gauge, or a simple switch can be used. In this embodiment, the sensor 71 is disposed on the outer circumferential surface of the restricting section 811. However, the disposition of the sensor 71 is not particularly limited. The sensor 71 is explained above. A sensor 72, which is the same as the sensor 71, is provided in the restricting member 82 as well.

As explained above, the power transmission mechanism 3 in this embodiment includes the sensor 71 that detects the contact of the restricting section 811 and the belt 36. Consequently, an abnormality of the power transmission mechanism 3 can be detected and can be used as a material for determining, for example, necessity of maintenance.

According to the second embodiment explained above, it is possible to exert the same effects as the effects in the first embodiment explained above.

Third Embodiment

Figure 11:
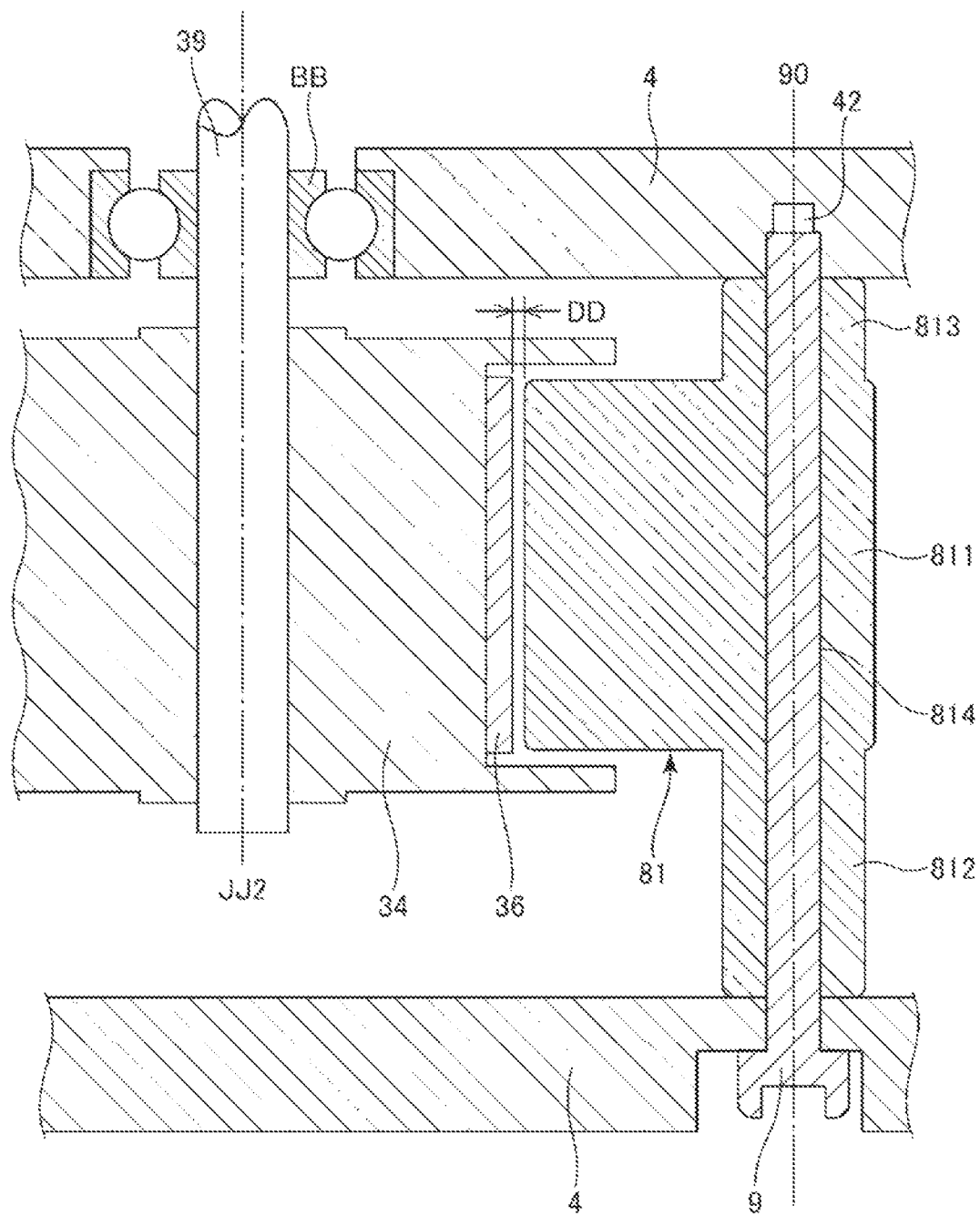
FIG. 11 is a sectional view showing a power transmission mechanism in a third embodiment.

FIG. 11 is a sectional view showing a power transmission mechanism in a third embodiment.

The robot 100 in this embodiment is the same as the robot 100 in the first embodiment except that the configuration of the restricting members 81 and 82 are different. Accordingly, in the following explanation, concerning this embodiment, differences from the first embodiment explained above are mainly explained. Explanation of similarities to the first embodiment is omitted. In the figures in this embodiment, the same components as the components in the first embodiment explained above are denoted by the same reference numerals and signs. Since the restricting members 81 and 82 have the same configuration, in the following explanation, the restricting member 81 is representatively explained. Explanation of the restricting member 82 is omitted.

As shown in FIG. 11, the restricting member 81 is supported by the fixed member 4 on both the sides, that is, the upper end side and the lower end side in the direction extending along the center axis 90. Consequently, since the restricting member 81 is supported at both ends by the fixed member 4, for example, the posture of the restricting member 81 is more stable compared with the first embodiment in which the restricting member 81 has a cantilever support structure. Accordingly, adjustment accuracy of the separation distance DD is improved.

The restricting member 81 includes the restricting section 811, the projecting section 812 projecting downward from the restricting section 811, and a projecting section 813 projecting upward from the restricting section 811. The projecting section 813 is formed in a columnar shape like the projecting section 812. The center axis of the projecting section 813 coincides with the center axis 90. In the restricting member 81, instead of the screw hole 810, a through-hole 814, through which the screw 9 is inserted, is formed to pierce through the upper surface and the lower surface of the restricting member 81.

In the fixed member 4, a screw hole 42 that screws with the screw 9 is formed in a position overlapping the through-hole 40 in addition to the through-hole 40. The screw 9 is inserted through the through-hole 40 and the through-hole 814 from the lower side and screwed and inserted into the screw hole 42. Consequently, the restricting member 81 is fixed to the fixed member 4 in a state in which the restricting member 81 is supported at both ends by the fixed member 4.

In such a power transmission mechanism 3, adjustment of the separation distance DD is performed as explained below. First, the screw 9 is loosened to enable the restricting member 81 to rotate around the center axis 90. Subsequently, the plate-like jig 10 is disposed between the restricting section 811 and the belt 36. Subsequently, the restricting member 81 is rotated around the center axis 90 to sandwich the jig 10 with the restricting section 811 and the belt 36. Subsequently, while this state is maintained, the screw 9 is tightened to fix the restricting member 81 to the fixed member 4. Finally, the jig 10 is removed from between the restricting section 811 and the belt 36. With the adjusting method explained above, the adjustment of the separation distance DD can be easily and accurately performed.

As explained above, in the power transmission mechanism 3 in this embodiment, the restricting member 81 is supported by the fixed member 4 on both the sides in the direction extending along the center axis 90. Consequently, since the restricting member 81 is supported at both ends by the fixed member 4, for example, the posture of the restricting member 81 is more stable compared with the first embodiment in which the restricting member 81 has the cantilever support structure. Accordingly, adjustment accuracy of the separation distance DD is improved.

According to the third embodiment explained above, it is possible to exert the same effects as the effects in the first embodiment explained above.

The robot and the adjusting method of the present disclosure are explained above based on the illustrated embodiments. However, the present disclosure is not limited to this. The components of the sections can be replaced with any components having the same functions. Any other components may be added to the present disclosure. The power driving mechanism may be applied to any equipment other than the robot.

What is claimed is:

1. A robot comprising:
a power source; and
a power transmission mechanism configured to transmit an output of the power source, wherein
the power transmission mechanism includes:
a fixed member;
a first pulley configured to rotate around a first axis with respect to the fixed member;
a second pulley disposed to be separated from the first pulley and configured to rotate, with respect to the fixed member, around a second axis parallel to the first axis;
a belt wound around the first pulley and the second pulley and configured to transmit the rotation of one of the first pulley and the second pulley to the other of the first pulley and the second pulley;
a restricting columnar disk disposed to be opposed to the belt with a gap in a portion where the first pulley and the belt mesh with each other, the restricting columnar disk having a disk center; and
a screw having a first center axis along a direction parallel to the first axis and configured to fix the restricting columnar disk to the fixed member,
the restricting columnar disk eccentrically rotates around the first center axis to thereby change a distance of the gap between the restricting columnar disk and the belt in a plan view,
a part of the belt that is meshed with the first pulley and the gap exist on a line connecting between the first axis and the disk center in the plan view,
the first pulley and the restricting columnar disk are located directly adjacent to each other via the belt and the gap, and
the screw is located between the disk center and a periphery of the restricting columnar disk and in the restricting columnar disk in the plan view.

2. The robot according to claim 1,
wherein the distance of the gap is shorter than a meshing depth of the first pulley and the belt.

3. The robot according to claim 1,
wherein the first pulley includes a pair of flanges located on both sides of the belt in a direction parallel to the first axis.

4. The robot according to claim 3,
wherein a length along the disk center of the restricting columnar disk is shorter than a separation distance between the pair of flanges, and the restricting columnar disk enters between the pair of flanges according to the rotation around the first center axis.

5. The robot according to claim 1,
wherein the restricting columnar disk is formed in a columnar shape.

6. The robot according to claim 1,
wherein the restricting columnar disk includes a projection projecting from the restricting columnar disk a direction parallel to the first axis, and
the projection is located between the restricting columnar disk and the fixed member.

7. The robot according to claim 1, further comprising a sensor configured to detect contact between the restricting columnar disk and the belt.

8. The robot according to claim 1, wherein the restricting columnar disk is supported by the fixed member on both sides of the restricting columnar disk along the first center axis.

9. The robot according to claim 1, further comprising:
a base;
a first arm coupled to the base and configured to turn around a first turning axis with respect to the base;
a second arm coupled to the first arm and configured to turn around a second turning axis with respect to the first arm; and
a spline shaft disposed in the second arm and configured to rotate around a third turning axis with respect to the second arm, wherein the power transmission mechanism transmits the output of the power source and rotates the spline shaft around the third turning axis.

10. An adjusting method of a power transmission mechanism including:

a fixed member;

a first pulley configured to rotate around a first axis with respect to the fixed member;

a second pulley disposed to be separated from the first pulley and configured to rotate, with respect to the fixed member, around a second axis parallel to the first axis;

a belt wound around the first pulley and the second pulley and configured to transmit the rotation of one of the first pulley and the second pulley to the other of the first pulley and the second pulley;

a restricting columnar disk disposed to be opposed to the belt with a gap in a portion where the first pulley and the belt mesh with each other; and a screw having a first center axis along a direction parallel to the first axis and configured to fix the restricting columnar disk to the fixed member, the restricting columnar disk eccentrically rotating around the first center axis to thereby change a distance of the gap between the restricting columnar disk and the belt in a plan view, the adjusting method comprising:

rotating the restricting columnar disk around the first center axis to adjust the distance of the gap in a state in which the screw is loosened; and tightening the screw to fix the restricting columnar disk to the fixed member, wherein, in the adjusting, a jig is disposed between the restricting columnar disk and the belt and the jig is sandwiched by the restricting columnar disk and the belt to adjust the distance of the gap.

11. The adjusting method according to claim 10, wherein, when the screw is tightened to fix the restricting columnar disk to the fixed member, the restricting columnar disk is rotated around the first center axis together with the screw with friction of the screw and the restricting columnar disk to simultaneously perform the adjusting and the fixing.

* * * * *